H. WILLIAMSON.
SAW-MILL DOG.
No. 173,249. Patented Feb. 8, 1876.
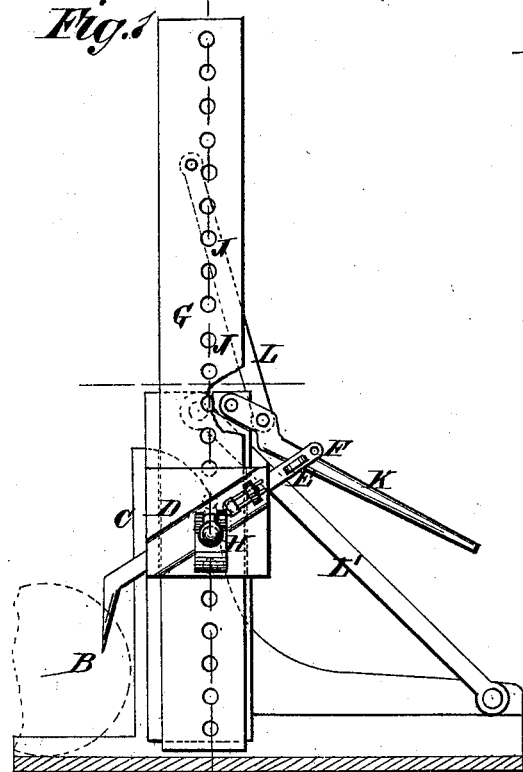
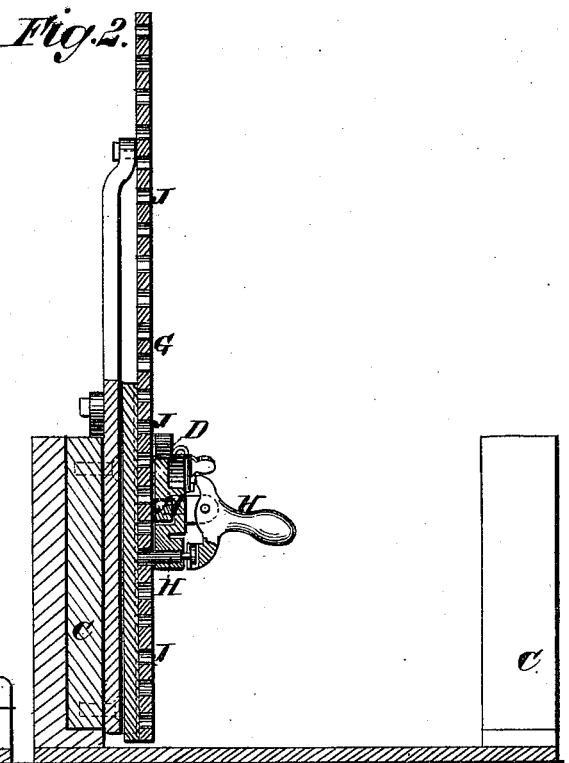
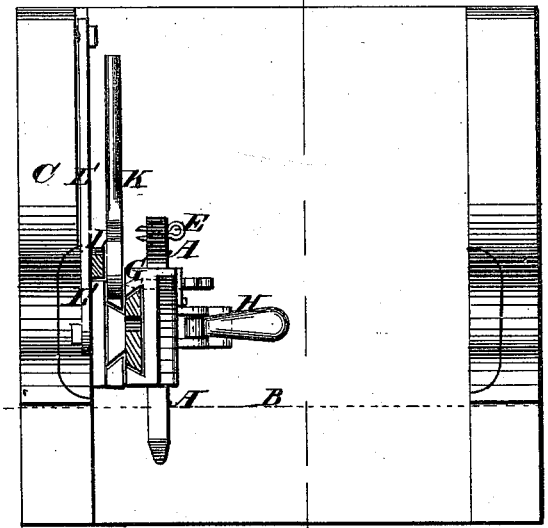
WITNESSES:
Francis McArdle
A. F. Terry
INVENTOR:
H. Williamson
BY Munn & Co
ATTORNEYS.

UNITED STATES PATENT OFFICE.

HENRY WILLIAMSON, OF BAY CITY, MICHIGAN.

IMPROVEMENT IN SAW-MILL DOGS.

Specification forming part of Letters Patent No. 173,249, dated February 8, 1876; application filed August 21, 1875.

*To all whom it may concern:*

Be it known that I, HENRY WILLIAMSON, of Bay City, in the county of Bay and State of Michigan, have invented an Improvement in Saw-Mill Dogs, of which the following is a specification:

The invention relates to an improvement upon the saw-mill dog shown in Patent No. 150,534, and relates to the construction and arrangement of parts whereby the sliding bar which carries the dog is attached to the frame and supported by its operating-lever, as hereinafter described and claimed.

Figure 1 is a side elevation of my improved saw-mill dog. Fig. 2 is a sectional elevation taken on the line $x\ x$ of Fig. 1, and Fig. 3 is a horizontal section taken on the line $y\ y$.

Similar letters of reference indicate corresponding parts.

A represents the dog for holding the log B against the upright part C of the knee. It is mounted on the block D, so as to slide lengthwise to extend it more or less from the knee, being preferably inclined so as to slide forward by gravity, and having a pin, E, and holes F to hold it. The block is fitted on the vertical standard G, so as to shift up and down readily, and has a stop-pin, H, with a lever-handle, I, to hold it in any position by the holes J. The standard G is fitted so as to slide up and down on the knee C, and a hand-lever, K, pivoted to the knee and coupled with it by the rod L, is used to lift it up and press it down for connecting and disconnecting the dog with the log, thus making a simple and efficient lever-power dog which is adjustable to logs of any size. L' is a brace to the knee of the head-block.

The arrangement of the lever is such that it will support the slide-bar or standard G when it (the lever) is raised to a vertical position. Said bar may be readily removed from the frame by sliding it upward.

What I claim is—

The sliding bar or standard G, carrying the adjustable dog D, the frame C, having a dove-tailed groove in its vertical face, the lever K, pivoted as shown, and the connecting-bar L, all combined, constructed, and arranged as and for the purpose set forth.

HENRY WILLIAMSON.

Witnesses:
JAMES M. LAING,
LINAS HART.